United States Patent [19]

Armstrong

[11] 4,078,169

[45] Mar. 7, 1978

[54] APPARATUS FOR PROMOTING PLANT GROWTH WITH ARTIFICIAL LIGHT

[76] Inventor: J. Delvin Armstrong, 2224-137th Pl. SE., Bellevue, Wash. 98005

[21] Appl. No.: 716,763

[22] Filed: Aug. 23, 1976

[51] Int. Cl.² .......................................... H05B 33/02
[52] U.S. Cl. .................................. 362/122; 362/217; 362/805
[58] Field of Search ................. 240/51.11 R, 41.35 R, 240/41.35 F, 41.36, 103 R

[56] References Cited

U.S. PATENT DOCUMENTS

| | | | |
|---|---|---|---|
| 3,009,054 | 11/1961 | Thomas | 240/51.11 R |
| 3,025,391 | 3/1962 | Golko | 240/41.11 R |
| 3,363,093 | 1/1968 | Schmitt | 240/41.35 R |
| 3,673,733 | 7/1972 | Allen | 240/51.11 R |
| 3,679,893 | 7/1972 | Shemitz | 240/51.11 R |
| 3,763,348 | 10/1973 | Costello | 240/103 R |
| 3,777,135 | 12/1973 | Rees | 240/41.35 R |
| 3,829,677 | 8/1974 | Dellano | 240/41.35 R |

*Primary Examiner*—Richard L. Moses

[57] ABSTRACT

An elongated light source is positioned at the focal point of a reflector which is shaped so that the majority of the light generated by the light source is provided over a 60° included angle along its length, uniformly illuminating a defined area on a light delivery plane, the defined area having a longitudinal dimension equal to the length of the light source, and a transverse dimension equal to the distance between the reflector and the light delivery plane.

8 Claims, 3 Drawing Figures

APPARATUS FOR PROMOTING PLANT GROWTH WITH ARTIFICIAL LIGHT

BACKGROUND OF THE INVENTION

The present invention relates generally to the art of promoting plant growth, and more particularly, is concerned with apparatus which aids in the promotion of plant growth through the use of artificial light.

It is well known that artificial light promotes plant growth. It is also well-known that certain light wavelengths are particularly effective in the promotion of plant growth. As a result, a significant effort has been made by the industry, in light of the current interest in using plants in environments which often lack natural light, such as homes an offices, to develop special-purpose lamps, generally referred to as plant lamps. Many of the major lamp manufacturers have designed, and are currently marketing, lamps which are advertised to be of particular efficacy in the promotion of plant growth. These plant lamps produce most of their light in certain spectral energy bands, i.e., at those wavelengths which have been found to promote plant growth. These plant lamps usually contain special phosphors to produce those light wavelengths which are known to stimulate plant growth. Substantial success with such plant lamps has been demonstrated in a wide variety of circumstances.

As a consequence of both the research findings and the results obtained by the use of such plant lamps, the research efforts of industry in this field have been directed uniformly to the design and development of special purpose lamps.

However, such special-purpose, i.e., plant, lamps have the disadvantage of being significantly more expensive than their counterpart fluorescent or incandescent lamps. Additionally, the plant lamps, being directed as they are to a very specialized market, are offered in a limited number of sizes, configurations, and power ratings, as compared with their counterpart conventional lamps.

Furthermore, when the plant lamps are used with the available lamp fixtures, only 17-20% of the total light energy emitted by the plant lamp is actually delivered to the plants. The remainder is directed elsewhere and hence does not contribute to promoting plant growth. Such a low use efficiency, however, has not heretofore been considered important by the industry, however, because the wavelength, rather than the amount, of light delivered to the plants was considered the overriding consideration in promoting plant growth.

Additionally, the combination of plant lamps with the available light fixtures result in uneven plant growth patterns, thus reducing the effectiveness of the combination, due to a lack of uniformity in the light level delivered to the plants in a direction transverse of the light source.

Apart from the above disadvantages, it has been demonstrated in addition that plant lamps per se as such do not have quite the originally suspected advantage over their counterpart conventional lamps in promoting plant growth. Contrary, conventional lamps, i.e., fluorescent, have also been found to produce good results in promoting plant growth. These results, however, have been largely ignored by the industry and the direction of research effort has heretofore been channeled nearly exclusively in developing increasingly sophisticated, and hence more expensive, plant lamps.

In view of the above, it is a general object of the present invention to provide a plant lighting fixture which, when used in combination with a source of artificial light, overcomes one or more of the disadvantages of the prior art specified above.

It is another object of the present invention to provide such a plant lighting fixture which may be used in combination with both plant lamps and conventional lamps.

It is a further object of the present invention to provide such a plant lighting fixture which substantially increases the amount of light delivered to the plants.

It is an additional object of the present invention to provide such a plant lighting fixture which substantially increases the capability of conventional lamps to promote plant growth.

It is yet another object of the present invention to provide such a plant lighting fixture which reduces the amount of glare light.

It is a still further object of the present invention to provide such a plant lighting fixture which delivers uniform light energy over a defined surface area.

SUMMARY OF THE INVENTION

Accordingly, the present invention is an apparatus for promoting growth of plants through use of artificial light and includes a specially configured light reflector in combination with a light reflector housing which is open along its bottom side. The light reflector housing supports the light reflector without interfering with the light energy emitted from the light source. The apparatus further includes socket means adapted to receive an elongated light source, which is operative to emit light along its longitudinal axis and over a 360° included angle transversely of its longitudinal axis. The light reflector is so shaped, that when the light source is positioned at a predetermined location relative thereto, (1) the majority of the light energy emitted from the light source is delivered along its longitudinal axis over a 60° included angle transversely thereof onto a light delivery plane, and (2) light energy is uniformly delivered over a defined area, within which the plants are located, on said light delivery plane, said defined area, centered beneath said light reflector means, having a longitudinal dimension substantially equal to the length of the light source, and a transverse dimension equal to the vertical distance between said light delivery plane and said light reflector means.

DESCRIPTION OF THE DRAWINGS

A more thorough understanding of the invention may be made by a study of the following detailed description taken in connection with the accompanying drawings which.

DESCRIPTION OF THE PREFERRED EMBODIMENT

As stated above, it is known that conventional lamps aid in promoting plant growth, and that conventional lamps are more efficient, per se, i.e., they produce a greater light output for a given amount of power consumed, than the plant lamps. A conventional lamp will produce over three times the amount of light produced by a plant lamp per unit of power consumed. Yet, the direction of research in the industry remains concentrated on special-purpose lamps.

After reviewing the available data concerning the efficacies of both plant lamps and conventional lamps in the promotion of plant growth, the present inventor concluded that the promotion of plant growth with artificial light is more a factor of the amount and uniformity of light delivered to the plants, rather than the particular wavelength of the light delivered. The inventor then hypothesized that significant improvement in plant growth results could be most economically achieved by increasing the actual amount and uniformity of light energy delivered to the plant for a given amount of power consumed, rather than modifying the energy spectrum of the light so delivered, as is the currently accepted approach.

Under the approach of the present inventor, which is radically different than that taken by the prior art, the fact that conventional plant fixtures deliver only approximately 17-20% of the available light to the plants is far more significant than has heretofore been thought. A significant increase in the amount and uniformity of the light delivered to the plants, with a resulting increase in plant growth, is achieved by the use of the present invention. Significant cost savings as well as improved results, in lighting systems, accrue from use of the present invention, particularly when used in combination with conventional lamps.

Accordingly, the inventor has designed a special purpose light fixture which delivers to the plants the majority of the light generated by the lamp, instead of only 17-20%, as is the case with the prior art. The light fixture delivers light over a defined surface area, referred to as a light delivery area, in a uniform, yet penetrating, manner, because of the wide range of angles of the light rays as they are incident on the plants. The present approach is contrary to the direction of the prior art, yet has resulted in an apparatus which significantly increases plant growth with the light produced by a given lamp, making the use of conventional lamps especially attractive.

Figure 1:
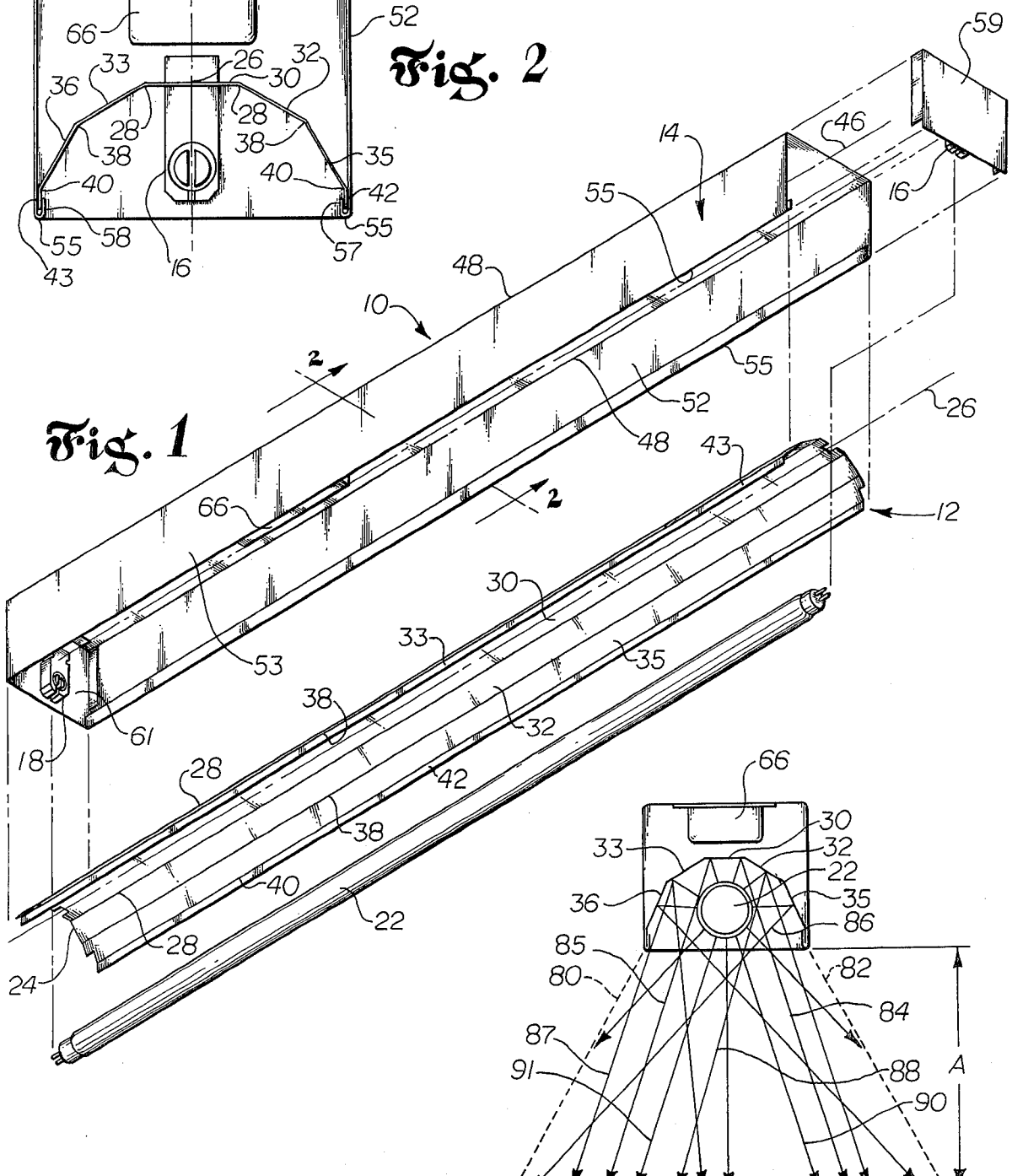
FIG. 1 is an exploded isometric view of the plant lighting fixture of the present invention, the view being directed into the fixture from the bottom thereof.

Referring now to FIG. 1, the light fixture of the present invention, designed so as to deliver a majority of the light generated from a given lamp over a defined surface area on which plants are located, is shown in an exploded configuration, generally at 10. Light fixture 10 comprises three basic elements, namely: (1) a reflector 12 which is shaped so as to reflect light uniformly over a 30° angle to each side of its longitudinal axis for a total of 60°; (2) a reflector housing 14, which supports reflector 12 and other apparatus, such as the lamp ballast; and (3) lamp sockets 16, 18 disposed operatively at the opposite ends of reflector 12 and adapted to receive a linear light source, shown generally at 22, which may be either a conventional lamp or a special purpose, i.e., plant lamp.

The embodiment shown and described is adapted for a single 48 inch conventional fluorescent tube. The dimensions of light fixture 10, although specified herein for purposes of illustration, do not limit the invention, since the light fixture may be provided in various sizes to accord with the size of the lamp used.

Figure 2:
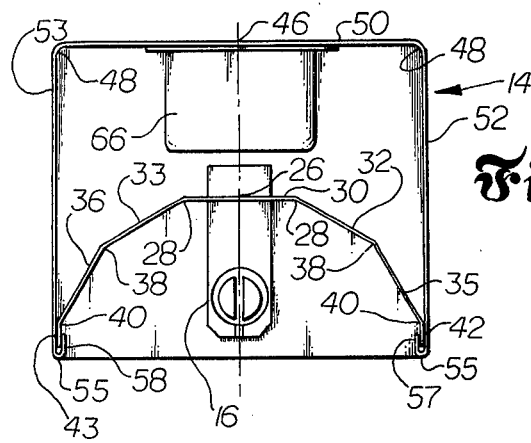
FIG. 2 is a transverse cross-section view of the reflector and the reflector housing portions of the light fixture of FIG. 1, taken along lines 2—2 thereof.

Referring again to FIG. 1, reflector 12 is formed from a rectangular section of anodized aluminum stock, having at least one side (i.e., inner surface 24) light reflective, preferably mirrored. The final shape of reflector 12 is achieved by bending the reflector stock into the general shape of a parabola along several longitudinal breaklines. The reflector stock for the preferred embodiment is 47⅞ inches long and 7 inches wide. The reflector stock is symmetrical about a longitudinal center line 26 both before and after being bent into its parabolic configuration, as shown most clearly in FIG. 2. In order to achieve the efficient utilization of available light, which is an object of the present invention, the reflector stock is bent into a shape having a transverse cross-section similar to that of a parabola, and used with a linear light source which is placed at or near the focal point of the reflector.

The reflector stock is bent along a total of six longitudinal breaklines, comprising three sets of breaklines, each breakline in each set being located symmetrically about longitudinal center line 26 relative to the other breakline in that set. The first two longitudinal breaklines 28—28 are spaced each ¾ inch from, and on opposite sides of, longitudinal center line 26 and the break angle is 30° downward from the horizontal. Hence, if top section 30, which is 1½ inches wide between longitudinal breaklines 28—28, is horizontally positioned, first intermediate sections 32 and 33 which are 1½ inches wide and immediately adjacent longitudinal breaklines 28—28, project downwardly at a 30° angle therefrom.

The second two longitudinal breaklines 38—38 divide first intermediate sections 32 and 33 respectively, from second intermediate sections 35 and 36. Second intermediate sections 35 and 36 are each 1½ inches wide, and project downwardly from breaklines 38—38 at an angle of 30°.

The third two longitudinal breaklines 40—40 divide second intermediate sections 35 and 36, respectively, from border sections 42 and 43. Border sections 42 and 43 are each ⅝ inch wide and project downwardly from longitudinal breaklines 40—40 at an angle of 30°. Border sections 42 and 43 are thus each disposed vertically when top section 30 is disposed horizontally, as is the typical orientation of light fixture 10. Border sections 42, 43 are used for support purposes, mating with the reflector housing 14, as will be described hereinafter.

Reflector 12 is 2 inches high and 4⅞ inches wide, which dimensions are particularly adapted to provide the desired utilization of light for a conventional fluorescent tube 22 located at or near the focal point of reflector 12.

Referring again now to FIGS. 1 and 2, reflector housing 14 is, in the embodiment shown and described, made from a rectangular section of steel stock, which for purposes of commercial attractiveness is painted textured black. The housing stock is approximately 13¼ inches wide and 47⅞ inches long, and is bent along the two sets of longitudinal breaklines, each set comprising two longitudinal breaklines each symmetrical about longitudinal center line 46. A first set of breaklines 48—48 are each located 2½ inches on either side of longitudinal center line 46, with the portion of reflector housing 14 between breaklines 48—48 being referred to as top section 50. The first set of breaklines 48—48 divide top section 50 from intermediate sections 52 and 53, which are each 4 inches wide and depend vertically downward, at a 90° angle, respectively, from top section 50 at breaklines 48—48.

A second set of breaklines 55 separate intermediate sections 52 and 53 from immediately adjacent border sections 57 and 58. Border sections 57 and 58 are each ⅜ inch wide, and there is a 180° bend between border sections 57, 58, respectively, and intermediate sections 52 and 53, such that border sections 57 and 58, respectively, are parallel with but separated by a small lateral distance from the inner surface of intermediate sections 52 and 53. The clearance between intermediate sections 52, 53 and their associated respective border sections 57 and 58 is just sufficient to permit the insertion therein of border sections 42 and 43 of reflector 12, which results in reflector 12 being firmly supported within reflector housing 14 without the necessity of additional supporting structure, which would interfere with light reflected by reflector 12 and delivered to the plants. Square end sections 59 and 61 close off the opposite longitudinal ends of reflector housing 14, which thus defines a rectangular prism open along the bottom side.

Referring again to FIG. 1, lamp sockets 16 and 18 are supported at the opposite longitudinal ends of reflector 12. Lamp sockets 16 and 18 are conventional in configuration and construction, and provide the necessary electrical connections for proper operation of linear light source 22. A conventional ballast 66 is supported on top section 50 of reflector housing 14, with appropriate connections (not shown) to lamp sockets 16, 18.

Figure 3:
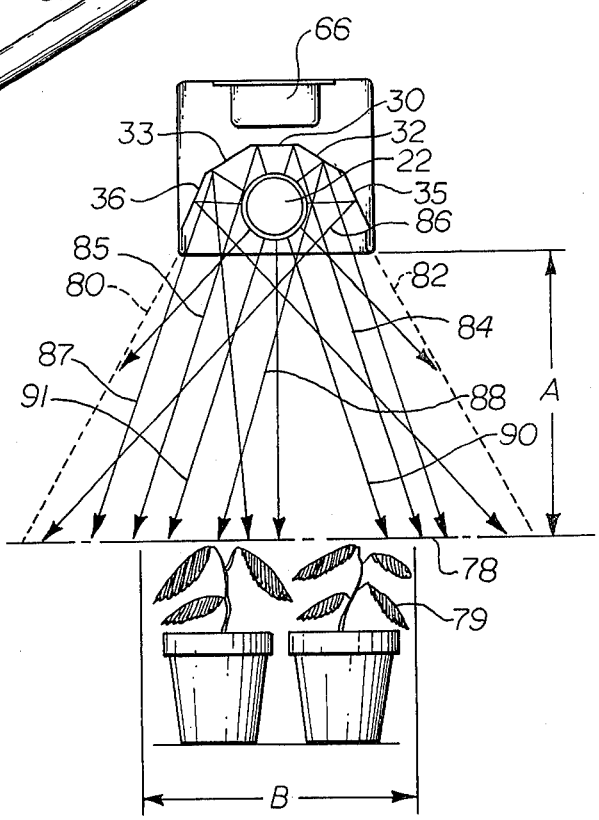
FIG. 3 is a transverse cross-section view of the lighting fixture of FIG. 1, taken along lines 2—2 thereof and showing, in addition, the path of selected light rays as they are first produced by the light source and then reflected by the reflector onto a surface area located with respect to particular plants.

The configuration of the various elements described in detail above, when assembled, results in a combination which, when used with a conventional fluorescent tube, results in delivery of a majority of the light produced thereby over a 60° transverse angle. The light provided by the light fixture of the present invention is most productive when the fixture is arranged with respect to a light delivery plane in the manner set out below. Referring to FIG. 3, light fixture 10 may be supported relative to a particular light delivery plane 78, which is coincident typically with the tops of plants 79, by a variety of conventional means (not shown), such as upstanding legs, or a chain, rope, or similar hanging means.

The manner in which light fixture 10 is supported is not particularly important; however, it is very important for light uniformity purposes, which is an object of the present invention, that lamp fixture 10 be arranged in a particular physical relationship to the light delivery plane. The correct positioning of light fixture 10 is shown in FIG. 3. Referring thereto, the included angle between dotted boundary lines 80 and 82 is 60°, which is the specified angle over which reflector 12 is designed to provide most, i.e., 60-70%, of the light generated by light source 22.

The actual physical area over which this light is delivered, however, depends both upon (1) the physical length of light source 22, and (2) the straight-line distance between dotted boundary lines 80 and 82. This lateral dimension will vary in accordance with the vertical distance between the light fixture and the location of the light delivery plane 78 which is coincident with the plants 79.

In the preferred embodiment, the light fixture 10 is positioned a convenient distance above the tops of the plants to be lighted. The tops of the plants 79 are substantially coincident with the light delivery plane 78.

The distance between dotted boundary lines 80, 82 at their intersections with light delivery plane 78 depends upon the vertical distance between light fixture 10 and light delivery plane 78, i.e., distance A. Light is provided uniformly over a light delivery area on light delivery plane 78. This light delivery area has a longitudinal dimension equal to the length of the light source 22, and a transverse dimension equal to the vertical distance between light fixture 10 and light delivery plane 78. Hence, distance B is the transverse dimension of the light delivery area and is equal to distance A. The light delivery area is centered directly underneath light fixture 10, as shown in FIG. 3. The plants 79 are then all arranged so that their foliage is covered by the light delivery area. With this arrangement, generally at least 50% of the light energy produced by light source 22 is provided uniformly over the entire light delivery area, producing equal growth, when other factors are equal, to those plants 79 located within the light delivery area.

Referring again to FIG. 3, the pattern of light produced by light fixture 10 is shown, with approximately 60-70% of the light produced by light source 22 being confined to a 60% triangular prism. Reflector 12 in combination with light source 22 produces several different patterns of light rays delivered to plants 79. A first group of light rays (e.g., rays 84, 85) strike top section 30 of reflector 12 after they are emitted from light source 22. Generally, all of the light rays striking top section 30 will be directed to the same side of the prism from which it originated; i.e., light ray 84 is initially directed toward the right side of the delivery area and is actually delivered thereto, while light ray 85 is initially directed toward the left side of the delivery area, and is actually delivered thereto.

Light rays reflected by the second intermediate sections 35 and 36, e.g., rays 86, 87 on the other hand, are all reflected back across the triangular prism to the opposite side from that in which they originated. Light rays reflected from the first intermediate sections 32, 33, e.g., rays 88, 89, cross and/or remain in the same side, depending on the point of reflection. Those light rays which cross the prism produce a higher degree of light penetration into the plant foliage than is obtained from light delivered essentially vertically to the plants, resulting in better plant growth for the apparatus of the present invention.

Another group of light rays, exemplified by rays 90, 91 escape the reflector 12 completely and are delivered directly to the plants. Some of these rays, however, will be delivered out of the 60° triangular prism and hence lost for practical use. However, a majority of even these light rays will be within the 60° triangular prism boundaries and hence will be effectively utilized to promote plant growth. Defining a light delivery area within which plants are located within the light delivery plane, with the light delivery area having a transverse dimension approximately equal to the mounting height of the light fixture above the light delivery area, has been discovered by the inventor to result in delivery of uniform light energy over the entire light delivery area, as well as providing the advantageous penetration effect noted above. Thus, plants can be placed on the light delivery area, and uniform growth can be achieved within the delivery area, other factors being equal.

Although an exemplary embodiment of the invention has been disclosed herein for purposes of illustration, it should be understood that various changes, modifications, and substitutions may be incorporated in such embodiment without departing from the spirit of the invention as defined by the claims which follow.

What is claimed is:

1. Apparatus for promoting the growth of plants with artificial light, comprising:

light reflector means, including socket means, adapted to receive an elongated light source operative to emit light along its longitudinal axis and over a 360° included angle transversely thereof, said light reflector means being symmetrical about its longitudinal centerline, which divides said light reflector means into two longitudinal sections, each section comprising at least three consecutively adjacent plane portions, a first plane portion being horizontally disposed, a second plane portion being positioned immediately adjacent said first plane portion and projecting approximately 30° downward therefrom, and a third plane portion being positioned immediately adjacent said second plane portion and projecting approximately 30° downward therefrom, so that said light reflector means approximates a parabola in cross-section, wherein the light source is positioned approximately at the focal point of said light reflector means, such that (1) the majority of the light energy emitted from the light source is delivered from said light reflector means along the longitudinal axis thereof and over a 60° included angle transversly thereof onto a light delivery plane, and (2) light energy is substantially uniformly delivered over a defined area, within which the plants are located, on said light delivery plane, said defined area, centered beneath said light reflector means, having a longitudinal dimension substantially equal to the length of the light source and a transverse dimension substantially equal to the vertical distance between said light delivery plane and said light reflector means; and light reflector housing means open along the bottom thereof for supporting said light reflector means without interfering with said light energy emitted therefrom.

2. An apparatus of claim 1, wherein said socket means is particularly adapted to receive a conventional fluorescent lamp tube.

3. An apparatus of claim 1, wherein said apparatus delivers at least 50% of the light emitted from the light source to said defined area on said light delivery plane.

4. An apparatus of claim 3, wherein said light reflector means, said socket means, and the light source are contained within said reflector housing means.

5. An apparatus of claim 1, wherein each said longitudinal section includes a fourth plane portion positioned immediately adjacent said third plane portion and positioned 30° downward therefrom, said fourth plane portion being disposed substantially vertically when said first plane portions are disposed horizontally.

6. An apparatus of claim 5, wherein said reflector housing means includes two longitudinal edges, each of which are formed into a lip adapted to receive a fourth plane portion of said light reflector means.

7. An apparatus for promoting the growth of plants with artificial light, comprising:

a. light reflector means, including socket means, adapted to receive an elongated light source operative to emit light along its longitudinal axis and over a 360° included angle transversly thereof, said light reflector means being symmetrical about its longitudinal centerline, which divides said light reflector means into two longitudinal sections, each section comprising at least four consecutively adjacent plane portions, a first plane portion being horizontally disposed, a second plane portion being positioned immediately adjacent said first plane portion and projecting approximately 30° downward therefrom, a third plane portion being positioned immediately adjacent said second plane portion and projecting approximately 30° downward therefrom, and a fourth plane portion positioned immediately adjacent said third plane portion and projecting 30° downward therefrom, said fourth plane portion being substantially vertical when said first plane portion is horizontal and further, being adapted to be received into a corresponding lip portion of said light reflector housing means, so as to define a parabola in cross-section, wherein the light source is positioned approximately at the focal point of said light reflector means, such that the majority of the light energy emitted from the light source is delivered from said light reflector means along the longitudinal axis thereof and over a 60° included angle transversly thereof;

b. light reflector housing means open along the bottom thereof for supporting said light reflector means without interfering with said light energy emitted therefrom; and c. light delivery platform means adapted to support one or more plants thereon and positioned such a distance beneath the combination of said light reflector means and said light reflector housing means that light energy is substantially uniformly delivered over a defined area on a light delivery plane which in turn is located at a predetermined position between said combination and said light delivery platform means and is furthermore substantially coplanar with the plants, said defined area, centered beneath said light reflector means on said light delivery plane, having a longitudinal dimension substantially equal to the length of the light source and a transverse dimension equal to the vertical distance between said light delivery plane and said combination.

8. An apparatus of claim 7, wherein said apparatus delivers at least 50% of the light emitted from the light source to said defined area on said light delivery plane.

* * * * *